United States Patent
Kern-Emmerich et al.

(10) Patent No.: US 8,596,687 B2
(45) Date of Patent: Dec. 3, 2013

(54) PRESS FITTING FOR A PIPE, PARTICULARLY A PLASTIC PIPE OR A PLASTIC AND METAL COMPOSITE PIPE

(75) Inventors: Thomas Kern-Emmerich, Niederwerrn (DE); Rudolf Geier, Sulzfeld (DE); Bernd Kaufmann, Hassfurt (DE); Markus Friedrichs, Steinfurt (DE)

(73) Assignee: Uponor Innovation AB, Virsbo (SE)

( * ) Notice: Subject to any disclaimer, the term of this patent is extended or adjusted under 35 U.S.C. 154(b) by 84 days.

(21) Appl. No.: 12/994,513

(22) PCT Filed: Jun. 5, 2009

(86) PCT No.: PCT/EP2009/056958
§ 371 (c)(1),
(2), (4) Date: Jan. 4, 2011

(87) PCT Pub. No.: WO2009/150108
PCT Pub. Date: Dec. 17, 2009

(65) Prior Publication Data
US 2011/0101673 A1    May 5, 2011

(30) Foreign Application Priority Data

Jun. 9, 2008  (DE) .......................... 10 2008 027 382

(51) Int. Cl.
*F16L 37/00* (2006.01)
(52) U.S. Cl.
USPC .......................................... 285/305; 285/321
(58) Field of Classification Search
USPC .................................................. 285/305, 321
See application file for complete search history.

(56) References Cited

U.S. PATENT DOCUMENTS

| | | | | | |
|---|---|---|---|---|---|
| 1,899,343 | A | * | 2/1933 | Mackey et al. | 285/321 |
| 2,038,869 | A | * | 4/1936 | Rader | 285/321 |
| 2,038,871 | A | * | 4/1936 | Mueller et al. | 285/321 |

(Continued)

FOREIGN PATENT DOCUMENTS

| | | |
|---|---|---|
| BE | 459616 | 9/1945 |
| DE | 4204430 | 8/1993 |

(Continued)

OTHER PUBLICATIONS

Bohnisch, Siegfried "Die flexiblen Verteilersysteme aus Kunststoff für Sänitar and Heizung—SBK—Wasserverteiler 4001" Kunststofftechnik GmbH, p. 14 May 1, 2004.

(Continued)

*Primary Examiner* — David E Bochna
(74) *Attorney, Agent, or Firm* — Occhiuti & Rohlicek LLP

(57) ABSTRACT

A fitting for a pipe, has a base body and a connecting body, each having a passage for a fluid. Both bodies include contact surfaces that can be slid into each other, including at least one pair of opposing recesses forming a receiving chamber. The fitting has a flexible, substantially incompressible locking element that can be inserted into the receiving chamber for fixing the two bodies together. At least one of the two bodies includes an access chamber extending between an outer surface of the associated body and the receiving chamber. The access chamber connects to and is an extension of the receiving chamber. The locking element includes a stop protrusion at one of its opposite ends for stopping the locking element externally at least one of the two bodies in order to prevent the locking element from unintentionally slipping out of the receiving chamber.

16 Claims, 6 Drawing Sheets

(56) References Cited

U.S. PATENT DOCUMENTS

| | | | |
|---|---|---|---|
| 2,458,714 A | | 1/1949 | Mahoney |
| 2,969,994 A | * | 1/1961 | Jacobs et al. ............... 285/321 |
| 3,127,199 A | | 3/1964 | Roe |
| 3,239,244 A | * | 3/1966 | Leinfelt .................. 285/305 |
| 3,560,026 A | * | 2/1971 | Roe ...................... 285/321 |
| 4,396,210 A | | 8/1983 | Spencer, III et al. |
| 4,427,221 A | * | 1/1984 | Shay, Jr. ................. 285/305 |
| 4,611,834 A | | 9/1986 | Rabinovich |
| 4,749,192 A | * | 6/1988 | Howeth ................... 285/305 |
| 5,165,832 A | * | 11/1992 | Dimov .................... 285/305 |
| 5,490,694 A | | 2/1996 | Shumway |
| 6,179,347 B1 | | 1/2001 | Dole et al. |
| 6,325,424 B1 | * | 12/2001 | Metcalfe et al. ............ 285/305 |
| 6,343,813 B1 | * | 2/2002 | Olson et al. ............... 285/305 |
| 6,352,288 B1 | | 3/2002 | Calkins |
| 6,739,629 B2 | * | 5/2004 | Riedy et al. ............... 285/305 |
| 7,481,464 B2 | * | 1/2009 | Fusser .................... 285/305 |
| 2003/0234536 A1 | | 12/2003 | Riedy et al. |

FOREIGN PATENT DOCUMENTS

| | | |
|---|---|---|
| DE | 102004034686 | 1/2006 |
| DE | 102006026263 | 7/2007 |
| EP | 0582345 | 2/1994 |
| EP | 0582354 | 2/1994 |
| WO | 2006/007944 | 1/2006 |
| WO | 2009/015927 | 2/2009 |

OTHER PUBLICATIONS

"Fallrohrstützenbefestigung für SML—Fallrohstützen" product information, MEFA Befestigungs-und Montagesysteme GmbH.

"G3 Sanpress" product information. www.viega,de (Jul. 3, 2008).

"iFIT-Baukastensystem" GF Piping Systems datasheet, Georg Fischer, Rohrleitungssysteme AG, www.gf.com.

* cited by examiner

PRESS FITTING FOR A PIPE, PARTICULARLY A PLASTIC PIPE OR A PLASTIC AND METAL COMPOSITE PIPE

CROSS-REFERENCE TO RELATED APPLICATIONS

This application is the National Stage of International Application No. PCT/EP2009/056958, filed on Jun. 5, 2009, which claims the priority of German Patent Application No. 10 2008 027 382.1, filed on Jun. 9, 2008. The contents of both applications are hereby incorporated by reference in their entirety.

A press fitting for a pipe, particularly a plastic pipe or a plastic and metal composite pipe.

FIELD OF DISCLOSURE

The invention relates to a fitting for a pipe, particularly a plastic pipe or a plastic-metal composite pipe.

BACKGROUND

Fittings for pipes are known in a wide variety of embodiments. Said fittings are typically constructed as a whole piece, for example, as pipe connectors, tees, elbows, or bulkhead fittings. Each pipe cross section requires the production of special fittings, which drives up the number of variants needed.

Modular fitting systems have previously been proposed, in which connecting bodies of various dimensions can be attached to a base part, such as a tee or an elbow. Examples of such modular or adaptive fittings are found in DE 42 04 430 A1 and DE 10 2006 026 263 B3.

SUMMARY

The object of the invention is to provide a modular fitting for a pipe, particularly a plastic pipe or a plastic-metal composite pipe having a simplified, releasable, or repeatedly releaseable joining technique.

The object is achieved according to the invention by a fitting for a pipe, particularly a plastic pipe or a plastic-metal composite pipe, wherein the fitting has
- a base body having a passage for a fluid,
- a connecting body releaseably connectable to the base body, also comprising a passage for a fluid, to which a pipe can be connected,
- wherein both bodies comprise contact surfaces that can be slid into each other and comprising at least one pair of opposite recesses forming a receiving chamber, and
- a substantially incompressible and flexible locking element that can be inserted into the receiving chamber for fixing the two bodies to each other,
- wherein at least one of the two bodies comprises an access chamber extending between an outer surface of said body and the receiving chamber,
- wherein the access chamber substantially connects to the receiving chamber as an extension thereof, and
- wherein the locking element comprises a stop protrusion at one of the opposite ends thereof for stopping the locking element externally at least one of the two bodies, for preventing the locking element from unintentionally slipping out of the receiving chamber.

The fitting according to the invention comprises a base body and a connecting body releaseably connectable to the base body. Both bodies comprise passages for a fluid connecting to each other in the connected state of the two bodies. The concept of assembling a fitting from a base body and a connecting body has the advantage that a plurality of different connecting bodies can be attached to one and the same base body. Said connecting bodies can differ with regard to the geometry of the pipe to be connected (pipe dimensions), but also with regard to the joining technique of the pipes to the connecting bodies. It is thus possible, for example, to connect press fit, slip fit, and threaded sleeve connector bodies to one and the same base body.

A modular fitting has further advantages in the production method. The base body of the fitting can be produced only by die forging or casting, with high tooling costs, because it is generally not rotationally symmetrical. The connecting body and insert parts, in contrast, are generally rotationally symmetrical to the base body. A fitting is thus divided into a part that can be produced less simply (base body) and a part that can be produced more simply (connecting body). The more simple production of the connecting body has advantages for the overall production costs of the fitting. Using only a few die-forged or cast base bodies (such as elbows or tees), a complete fitting system can be established over a very wide range of nominal sizes (such as 25 to 110 mm). A modular fitting system further has the advantage that pressing the pipe to the fitting is not necessarily required at the construction site or at the site of the installation of the fitting, but can be done elsewhere, in that the connecting body is connected to the pipe, in order to connect the connecting body to the base body later.

The two bodies of the fitting according to the invention are slid into each other for connecting to each other. The two bodies thus have contact surfaces that can be telescoped and that face each other in the telescoped state. The contact surfaces, comprising in the simplest case a cylindrical external surface on one body (such as the connecting body) and a cylindrical internal surface on the other body (such as the base body), have at least one pair of recesses (such as grooves) facing each other in the telescoped state, that together define a receiving chamber. A strand-shaped locking element is inserted into said receiving chamber, fixing and thus locking the two bodies to each other like a feather key.

The particular feature of the fitting according to the invention is that a flexible, substantially incompressible locking element can be inserted into the receiving chamber from the outside. For this purpose, one of the two bodies has an access chamber (in the shape of a borehole in the simplest case) connecting the exterior of the body and the receiving chamber to each other and extending between the two. The access chamber thereby opens substantially continuously, that is, substantially without protrusions, into the receiving chamber. If the receiving chamber is (partially) annular in design, which is the case for cylindrical contact surfaces, the access chamber opens tangentially into the receiving chamber. An incompressible, flexible, substantially strand-shaped locking element in the form of, for example, a string, chain, cord, wire, or the like can now be inserted through the receiving chamber from the outside.

The recesses forming the receiving chamber between the two bodies, when said bodies are inserted into each other, extend expediently over a circumferential angle range of 180°, for example. The greater the circumferential angle over which the receiving chamber extends, the better tipping motions acting between the two bodies can be absorbed. In this respect, it is advantageous if the opposite recesses forming the receiving chamber extend along a circumferential angle of greater than 180°, particularly of up to 300°. If embodied as a helix, the recesses can even extend beyond 360°.

Furthermore, according to the invention, the locking element is stopped and fixed at the base body and/or connecting body, thus preventing unintentionally slipping out of the receiving chamber. For this purpose, the locking element comprises a stop protrusion at one of the opposite ends thereof, said protrusion engaging with a stop surface implemented on the base and/or connecting body, for example by hooking or otherwise engaging both elements, thus preventing the locking element from slipping out of the receiving chamber, and preventing the locking element from moving relative to the receiving chamber.

In an advantageous further development of the invention, the locking protrusion is also used for handling the locking element when inserting into the receiving chamber. This can be implemented either directly by manually exerting pressure by hand on the locking protrusion, for example; alternatively, using a tool is also possible. It is further advantageous if the locking protrusion also comprises a handling element, particularly a borehole, a recess, or a raised area for engaging a pulling tool by means of which the locking element can be pulled back out of the receiving chamber if necessary.

In order to be able to better protect the telescoping contact surfaces of the base body and connecting body against entry or loss of fluid, it is advantageous if at least one of the two bodies has a sealing element disposed ahead of the recess forming the receiving chamber, as seen from the passage of the particular body. Not only is the exit of fluid from the area between the telescoped contact surfaces prevented, but fluid is also stopped from entering the area of the receiving chamber.

As indicated above, the locking element that can be inserted in the receiving chamber is flexible and substantially incompressible. A plastic string, metal wire, flexible shaft or wire strand, or a chain are particularly suited as the locking element. The locking element must be able to be pushed completely through the access chamber and into the receiving chamber. It is thereby guided in both chambers by contact with the boundary surfaces thereof. Thus, when it is at least in the access chamber, the locking element can no longer yield laterally, but can be inserted further into the fitting, until it extends over the cross section of the receiving chamber, and thus can assume its locking function.

In an advantageous further development of the invention, one of the two bodies further has an additional access chamber. Both access chambers are thereby located at opposite ends of the receiving chamber, where they each open into the same preferably substantially continuously and smoothly. Using such a design, it is possible to pull the locking element back out, which is preferably flush with or recessed relative to the outer contour of the fitting in the inserted state. For this purpose, the locking element is inserted further into the receiving chamber, for example, until it is at least partially pushed out of the fitting again through the further access chamber adjacent to the receiving chamber. The end that is pushed out can then be captured using a gripping tool, such as a pliers or the like, and the locking element can thus can be pulled completely out of the fitting. Thus the locking between the base body and the connecting body is released, and the two can be separated from each other.

In an advantageous further development of the invention, both access chambers terminate adjacent to each other at the outer surface of the base body and/or connecting body. The outer surface of the respective body or bodies thereby comprises protrusions terminating in surfaces extending at angles to each other. Both of said surfaces are immediately adjacent to each other. When the locking element is completely inserted in the access chambers and the receiving chamber, the locking protrusion is located between the two surfaces, whereby for locking, the locking protrusion interacts with the edge of the opening of the one of the two access chambers in which the end of the locking element facing away from the locking protrusion is present.

In order to insert the locking element through the access chamber into the receiving chamber of a fitting, according to the previously mentioned example embodiments of the invention, a tool having a tool body is proposed, said tool body comprising a receptacle for receiving the end of the flexible, substantially incompressible locking element. Using said tool body, the locking element can be inserted through the access chamber into the receiving chamber.

In order to be able to remove the locking element out of the receiving chamber again in the case of an embodiment of the fitting having two access chambers, the tool has a flexible extension at its tool body for inserting in one of the two access chambers. Using said extension, the flexible locking element can be pushed forward until it partially protrudes out of the access chamber at the rear in the insertion direction past the outer surface of the fitting, so that said protruding area can then be captured by a gripper tool in order to remove the locking element completely out of the receiving chamber.

The flexible extension is expediently formed of the same material as that of the locking element and its cross section extends over the cross section of the access and receiving chambers or is smaller than this. As indicated above, the locking element is, for example, a plastic string. Therefore, the flexible extension is also formed from a piece of the same string.

The invention finally further relates to the use of a tool having a receptacle for receiving an end of the flexible, substantially incompressible locking element of a fitting of the type described above, in that as the end of the locking element is received by the receptacle, it is pushed through an access chamber into the receiving chamber. A further use of said tool having a flexible, substantially incompressible mandrel for inserting into one of the access chambers of a fitting according to one of the previously described embodiment examples relates to moving the locking element partially out of the receiving chamber and into, as well as out of, the other access chamber.

BRIEF DESCRIPTION OF THE DRAWINGS

The invention is described in more detail below, using an embodiment example and referencing the figures. They show.

DETAILED DESCRIPTION

Figure 1:
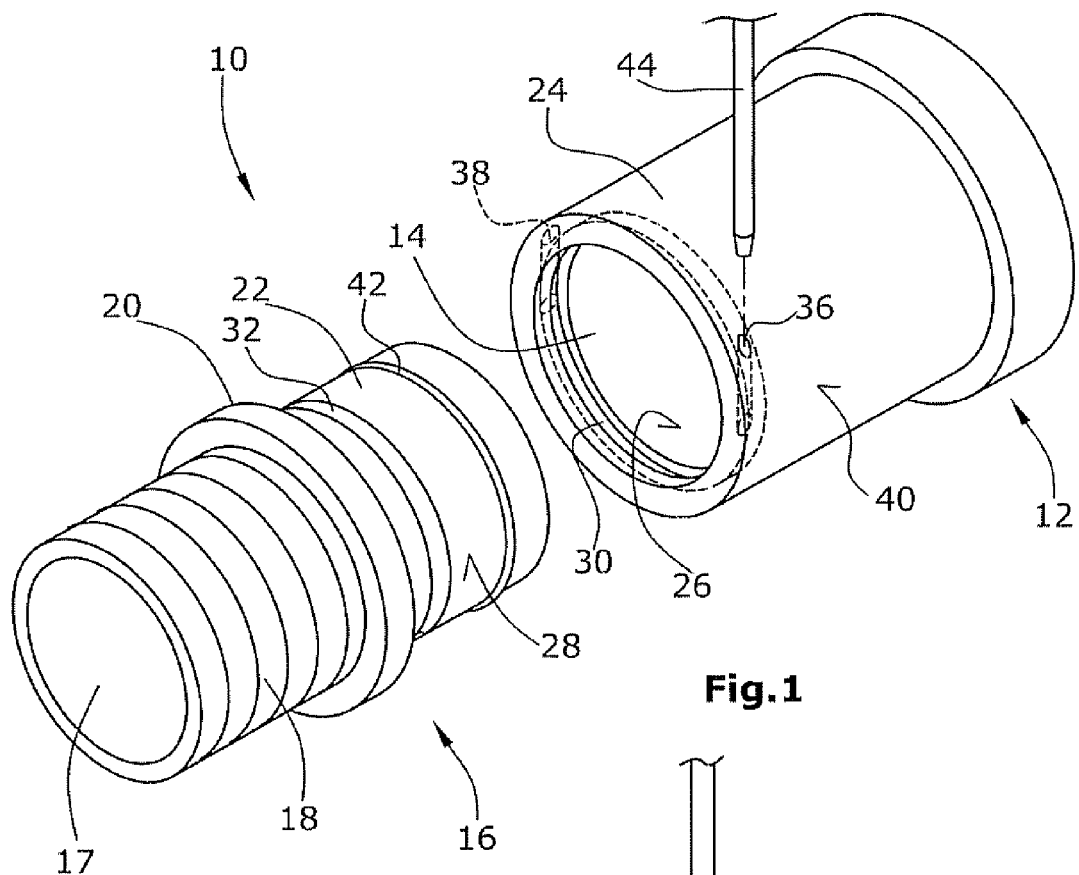
FIG. 1 perspective and explosion view of the individual components of a fitting having a base body and connecting body, and a locking element for locking both bodies in the pushed together state, FIG. 2 a cross section through the two bodies of the fitting in the pushed together state, but without the locking element inserted, FIG. 3 a longitudinal section through the two bodies of the fitting in the assembled state, and having the locking element inserted, FIG. 4 a cross-sectional view as in FIG. 2, but showing a tool by means of which the flexible locking element is inserted into the fitting for locking the base and connecting bodies.

FIG. 1 partially shows the individual components of a fitting for pipes 11, particularly plastic pipe or plastic-metal composite pipe, comprising a base body 12 having a fluid pass-through 14 and a connecting body 16 having a fluid pass-through 17. The pipe 11 can be connected to the connecting body 16 (see FIG. 3), for which purpose the connecting body 16 in this embodiment example comprises a support sleeve 18 and a press-fit sleeve (not shown), by means of which the pipe is pressed radially against the support sleeve (18) and press-fit. The connecting body 16 comprises a substantially cylindrical fitting body 20 that can comprise a sealing ring in the region of the support sleeve 18. Said sealing ring seals the pipe against the support sleeve 18 in a fluid-tight manner. The connecting body 16 further comprises an insertion sleeve 22 protruding out of the fitting body 20 thereof and that can be inserted in an insertion chamber, namely the passage 14 of the base body 12. The base body 12 has a wall 24 that is cylindrical in said embodiment example. This base body 12 can be implemented as a pipe connector for receiving two connecting bodies 16 at opposite ends as an elbow, as a wall fitting, or as a tee. The advantage of the modular fitting 10 is that the base body 12 can be used for connecting pipes having diameters of different sizes, in that one of a plurality of different connecting bodies 16 is selected for use with support sleeves 18 having different diameters. Such modular fitting concepts are known, for example, from the publications listed above.

Figure 2:
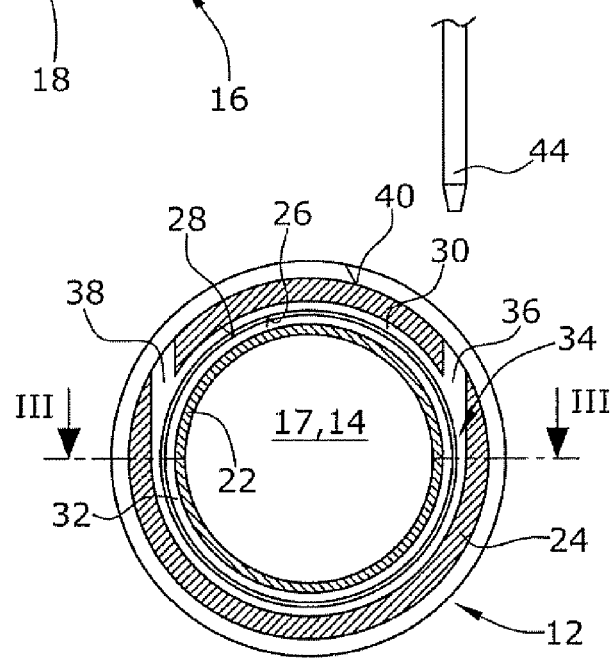
Figure 3:
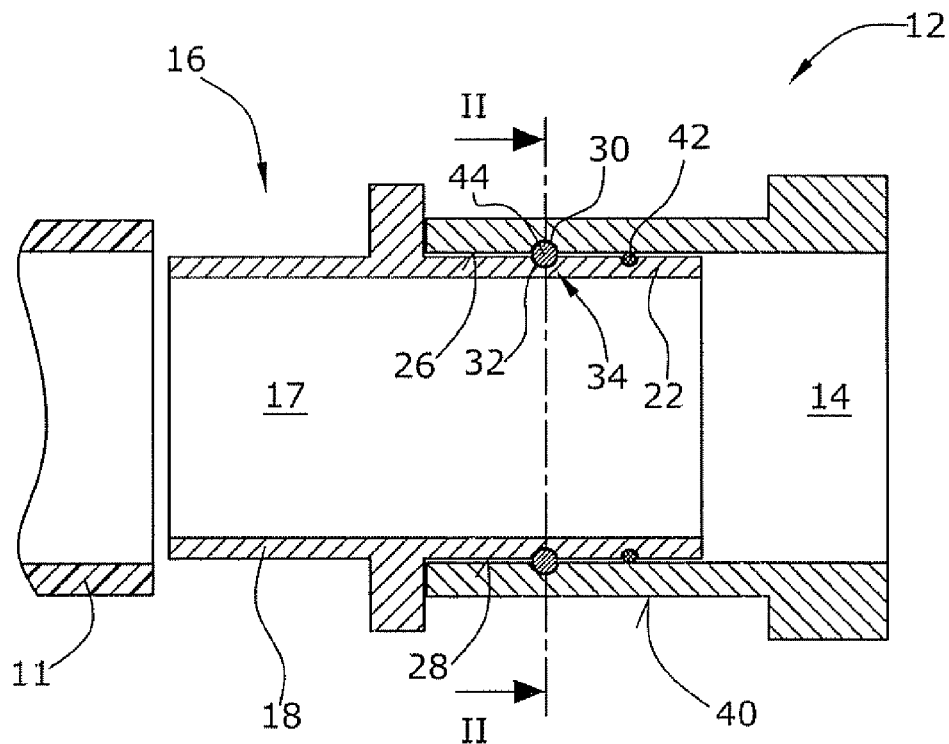

As seen in FIGS. 1 through 3, the base body 12 and the connecting body 16 comprise telescoping contact surfaces 26, 28 implemented cylindrically in said embodiment example. The contact surface 26 of the base body 12 is formed by a part of the inner side of the wall 24, whereas the contact surface 28 of the connecting body 16 is formed by a part of the cylindrical outer surface of the insertion sleeve 22. Said two contact surfaces have circumferential grooves or similar circumferential recesses 30, 32 that are located opposite each other in the inserted state (see, for example, FIGS. 2 and 3), that is, in a common radial plane. Said two recesses 30, 32 together form a substantially cylindrical receiving chamber 34, extending along the circumference (inner circumference of the base body 12 or outer circumference of the insertion sleeve 22 of the connecting body 16). Two access chambers 36, 38 implemented in the form of boreholes (see particularly FIG. 2) are also located in the base body 12, by means of which access to the receiving chamber 34 is provided through the wall 24 from the outer surface 40 of the wall 24. The two access chambers 36, 38 open substantially tangentially into the recess 30 on the inner contact surface 26 of the base body 12. The receiving chamber 34 extends over substantially 180° in this embodiment example. By implementing the access chambers 36, 38 at an acute angle to each other, it is also possible that the receiving chamber 34 extending between the two access chambers 36, 38 runs over greater than 180°. To the extent that both recesses 30, 32 extend in a helical shape, the receiving chamber 34 can also extend over 360° and more.

As can be seen from FIGS. 1 and 3, an annular sealing element 42 is located around the insertion sleeve 22 of the connecting body 16 and seals the opposing contact surfaces 26, 28 against each other and is disposed between the passage 14 or 17 and the receiving chamber 34. The sealing element 42 can alternatively also be located at the inner surface 26 of the base body 12, in order to seal the contact surfaces 26, 28 against each other.

In order to mechanically lock the two bodies 12, 16 inserted into each other, a flexible, substantially incompressible strand-shaped locking element 44 is implemented in this embodiment example in the form of a plastic string. Said plastic string 44 is inserted from the outside into one of the two access chambers 36, 38 and is slid into the same, wherein it enters the receiving chamber 34 through the respective adjacent access chamber 36, 38. When disposed in the receiving chamber 34, the locking element 44 locks the two bodies 12, 16 in the manner of a feather key. Said locking can be eliminated by removing the locking string 44.

Figure 4:
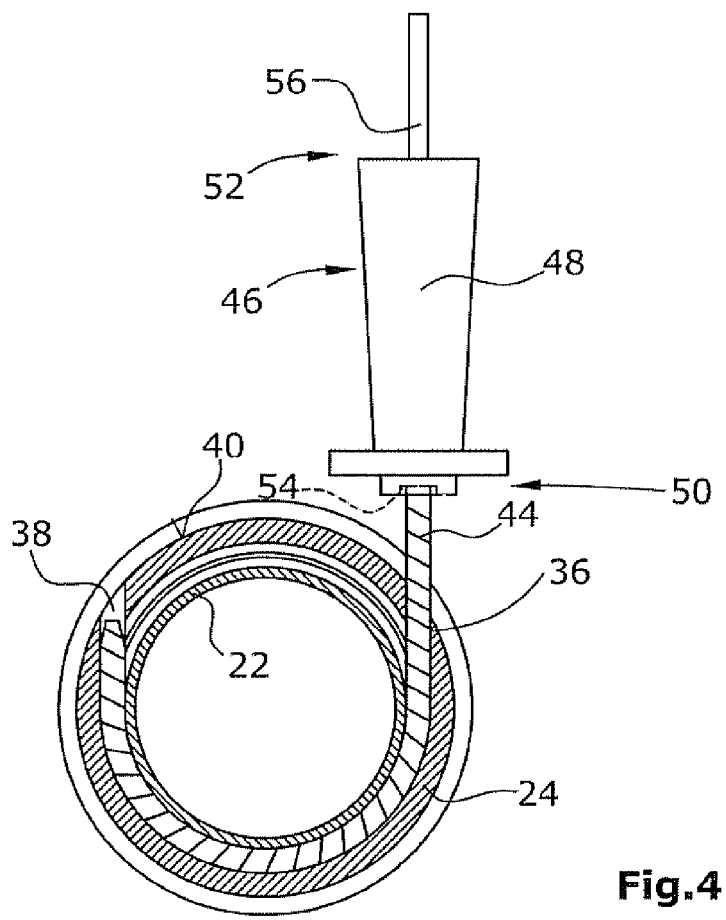
Figure 5:
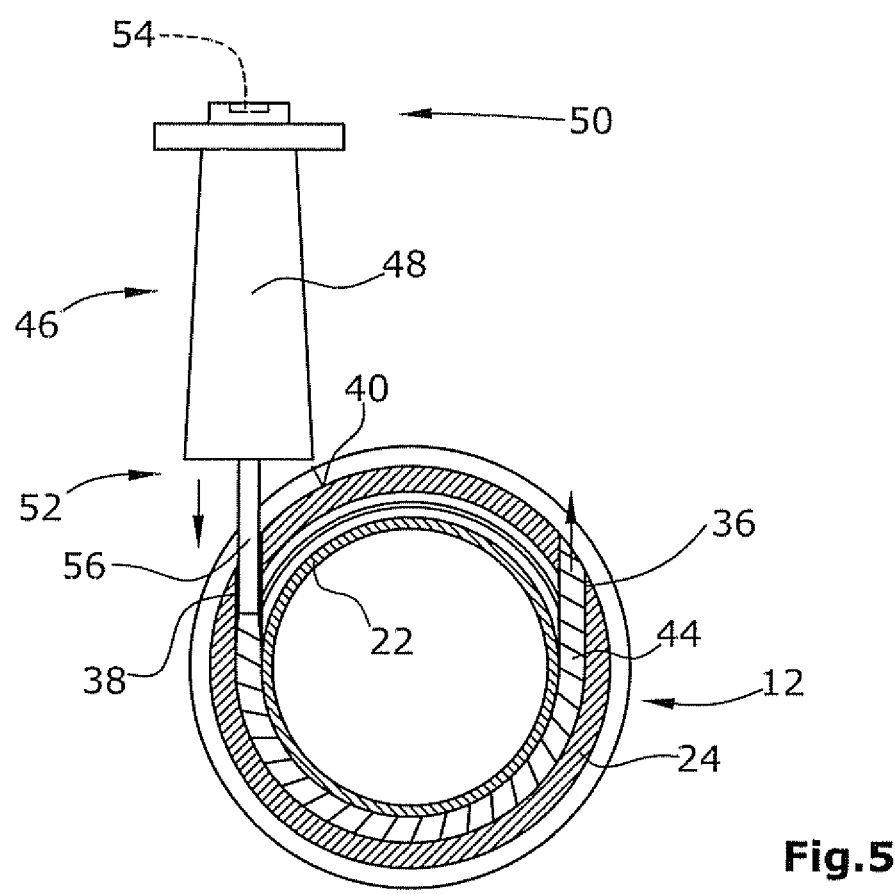
FIG. 5 a cross-sectional view as in the FIGS. 2 and 4, showing the use of the tool for removing the inserted locking element out in order to release the lock on the two bodies, FIG. 6 a section similar to that according to FIG. 2, through an alternatively implemented fitting, in which the receiving chamber extends through 270°, so that the two access chambers extending tangentially to each other terminate at the outer surface of the fitting directly adjacent to each other, FIG. 7 an embodiment example of a locking element implemented as a plastic string or bar, having a stop protrusion at one end and tapering conically at the other end, wherein the segment of the locking element adjacent to the conically tapering point is pre-bent, FIG. 8 the situation during insertion of the locking element into the receiving chamber of the fitting, FIG. 9 the situation as the locking element is inserted so far that its locking protrusion is located near the outer surface of the fitting, and FIG. 10 the situation when the locking element is fully inserted in the fitting and its stop protrusion is stopped at the fitting.
Figure 6:
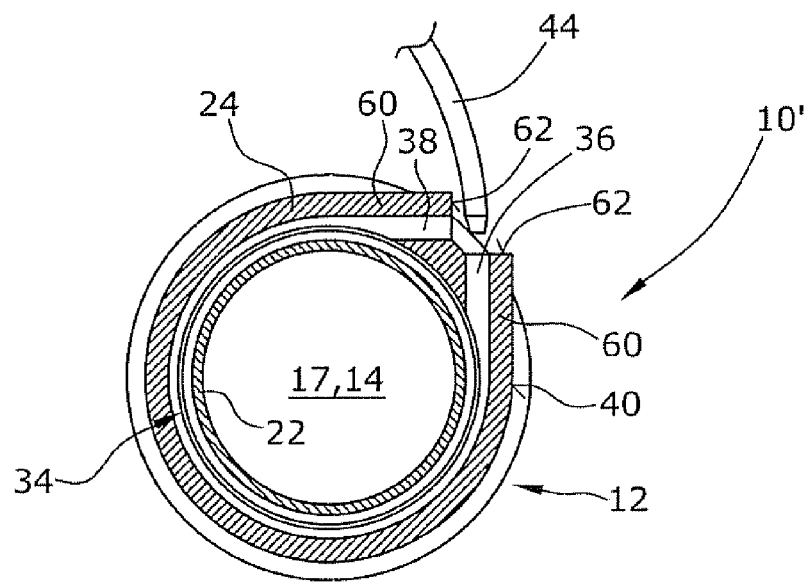
Figure 7:
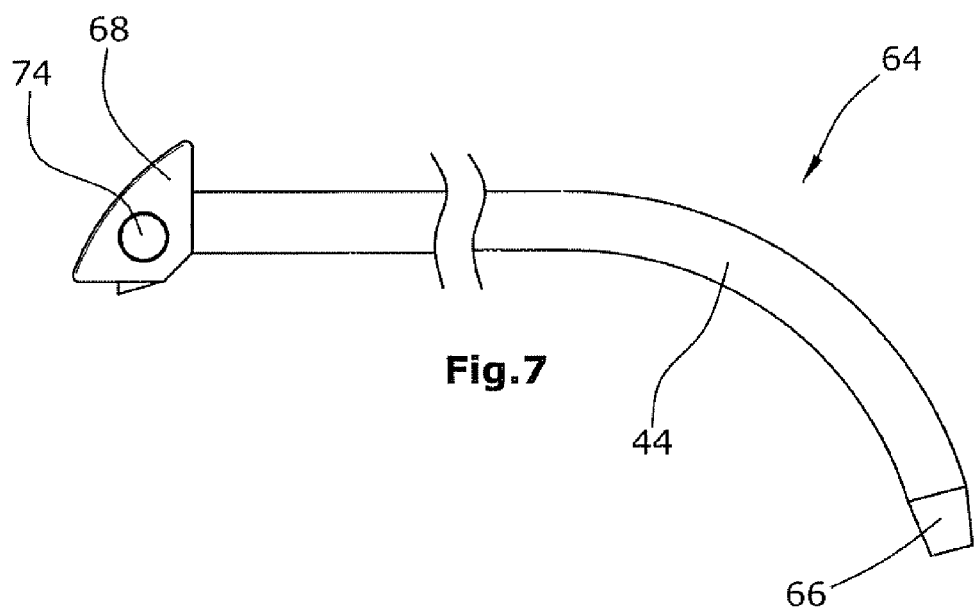

The locking string 44 can be fed into place expediently using a (sliding) tool 46, as is shown in FIGS. 4 and 5. The tool 46 comprises a tool body 48 that can be held in the hand and is preferably ergonomically formed, and having two opposite ends 50, 52. The tool body 48 comprises a (centering) receptacle 54 at one end (for example, end 50) in which the one end of the locking string 44 is inserted when said end is slid into the access chamber 36 and through the same into the receiving chamber 34. This situation is shown in FIG. 4. The tool 46 can be further used for partially moving back the locking string 44 that is completely slid into the fitting 10, as is shown in FIG. 5. For this purpose, the tool body 48 comprises a flexible mandrel 56 on the other end 52 thereof, expediently made of the same material and having the same geometry as the locking string 44. The tool 46 is made, for example, of plastic.

The mechanical locking of the two bodies 12, 16 of the fitting 10 is performed according to the invention by the flexible, substantially incompressible, strand-shaped locking element 44 when said element is located in the receiving chamber 34 formed in both bodies. It is thereby sufficient if the locking element 44 is located exclusively in said receiving chamber 34. Extension of the locking element 44 into one or both of the access chambers 36, 38 is not necessary in order to implement the locking function.

The invention is described above using a fitting 10, wherein the base body 12 and the connecting body 16 are locked to each other by means of a (single) locking element 44. Depending on the retaining forces required, it may be necessary to provide a plurality of flexible, substantially incompressible and strand-shaped locking elements 44, wherein a plurality of receiving chambers 34 are then also present. The a plurality of receiving chambers 34 can extend at different circumferential angle ranges, so that locking by a plurality of locking elements 44 is provided across the entire circumference.

A further embodiment example of a fitting 10' shown in the FIGS. 6 through 10, differs from the fitting 10 of FIGS. 1 through 5 in that the receiving chamber 34 extends over substantially 270°. In this respect, it is pointed out that the same references are used in FIGS. 6 through 10 for such elements of the fitting 10' that are identical in design and function to the elements of the fitting 10.

The base body 12 of the fitting 10' has two protrusions 60 on its outer surface 40, extending tangential to the receiving chamber 34 and transverse to each other. The access chambers 36 extend through the two protrusions 60. The access chambers 36, 38 end in the (end) surfaces 62, extending at an acute or obtuse angle, or, as in this embodiment example, at right angles to each other and at only a small distance from each other. The locking element 44 comprises a curved front end 64 having a tip 66 in the shape of a truncated cone, and has a locking protrusion 68 at the end opposite the tip 66.

Figure 8:
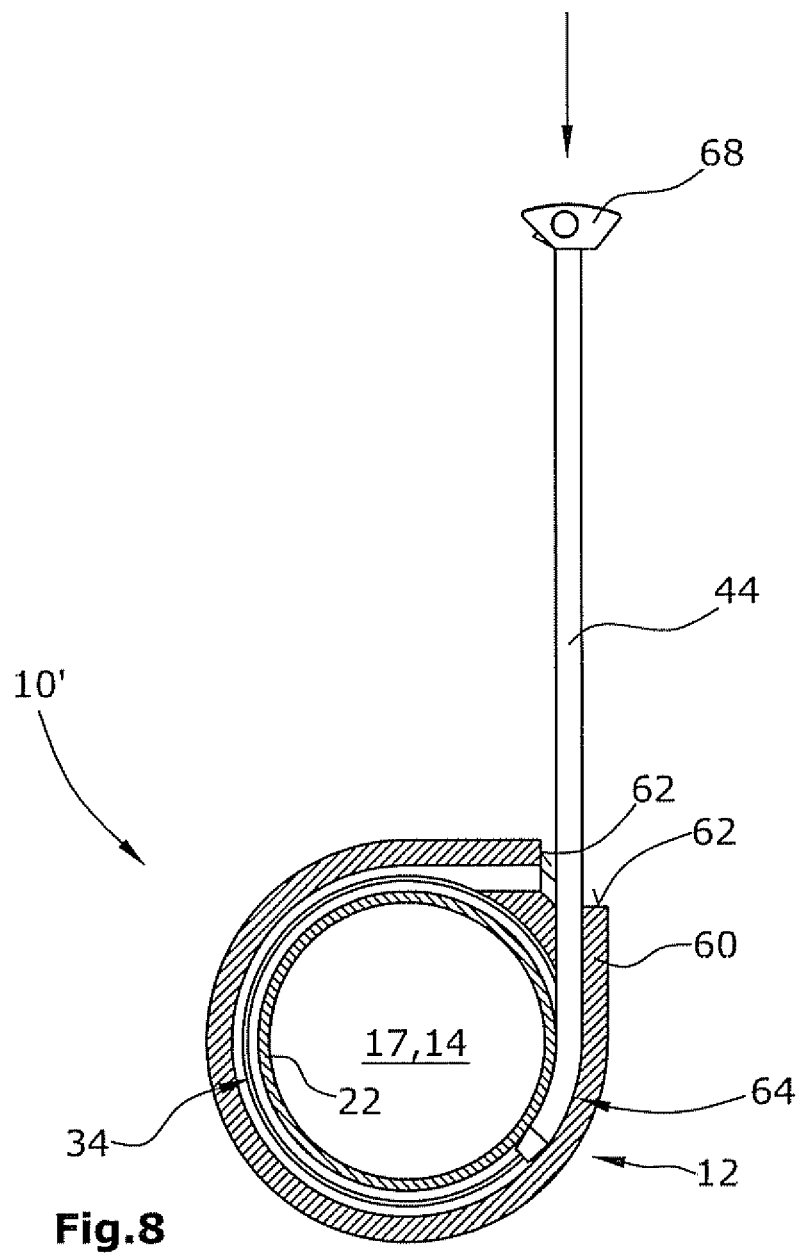
Figure 9:
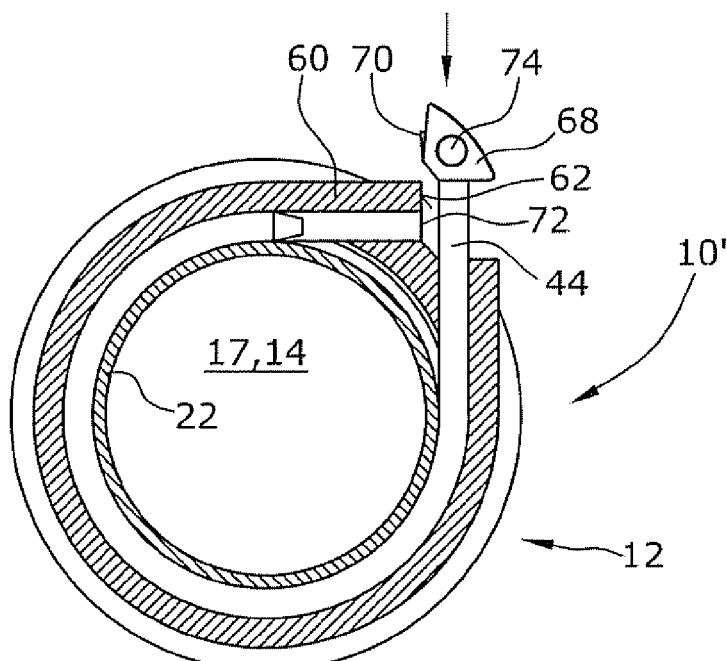
Figure 10:
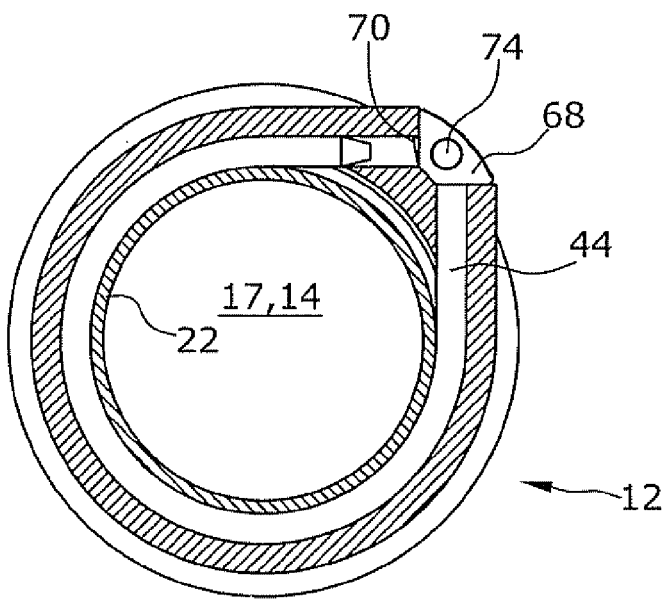

As seen in FIGS. 8 through 10, the curved end 64 of the locking element 44 is inserted into one of the two access chambers 36. When the locking element 44 is inserted into the access chamber 36 and the receiving chamber 34, manual pressure can be applied to the wider end of the locking element 44 comprising the stop protrusion 68. When the locking element 44 is nearly completely inserted in this manner, the result is the situation according to FIG. 9. If, starting from said situation, the locking element 44 is inserted further into the fitting 10', then the stop protrusion 68 in said embodiment example engages with a detent 70 in the access opening 72 of the surface 62 of the protrusion 60. This is shown in FIG. 10. The stop protrusion 68 then fills the free space between the two (end) surfaces 62 and thereby contacts the outer surface of the base body 12. The detent 70 effectively prevents the stop protrusion 68 from releasing and thus the locking element 44 from slipping out of the receiving chamber 34.

As can particularly be seen in FIGS. 7 through 10, the stop protrusion 68 comprises a hole 74, or simply a recess, running transverse to the extension of the locking element 44, that can be used in order to allow tensile forces acting on the stop protrusion 68. For example, a bar or the like can be inserted through the hole 74 and can then serve as a handle or grip, in order to pull the locking element 44 out of the fitting 10' by exerting tensile forces on the locking element 44.

What is claimed is:

1. A fitting for a pipe having
a base body having a passage for a fluid, the base body being circumferentially asymmetrical about an axis extending along a length of the passage for the fluid of the base body,
a connecting body releaseably connectable to the base body, also comprising a passage for a fluid, to which a pipe can be connected, the connecting body being circumferentially symmetrical about an axis extending along a length of the passage for fluid of the connecting body,
having both bodies comprise contact surfaces configured such that one of the contact surfaces can be slid into the other of the contact surfaces, comprising at least one pair of opposing recesses forming a receiving chamber, and
a substantially incompressible and flexible locking element that can be inserted into the receiving chamber for fixing the two bodies to each other, the locking element having opposing ends,
having at least one of the two bodies comprise a first access chamber extending between an outer surface of the at least one body and the receiving chamber,
having the first access chamber substantially connect to the receiving chamber in a tangential direction and as an extension thereof, and
having the locking element comprise a lock protrusion at one of the opposing ends thereof for locking the locking element externally at at least one of the two bodies in order to prevent the locking element from unintentionally slipping out of the receiving chamber.

2. The fitting according to claim 1, wherein a lock surface is implemented at the outer surface of the associated body in the area of the first access chamber, at which the lock protrusion of the locking element engages.

3. The fitting according to claim 1, wherein the contact surfaces are cylindrical and that the opposing recesses extend along at least one part of the contact surfaces in the circumferential direction.

4. The fitting according to claim 3, wherein the recesses extend along a circumferential angle between 180° and 300°.

5. The fitting according to claim 3 wherein the recesses are implemented as a helix and extend along a circumferential angle of more than 360°.

6. The fitting according to claim 1, wherein at least one of the contact surfaces comprises a sealing element disposed in the region between the passage and the recess.

7. The fitting according to claim 1, wherein the locking element is a plastic string, a metal wire, a flexible shaft, a chain, or a metal strand.

8. The fitting according to claim 7, wherein the locking element is curved and/or particularly conically tapered at its end facing away from the lock protrusion.

9. The fitting according to claim 1, wherein the lock protrusion comprises a handle, including one or more of a hole, a recess, or an embossment for applying a pulling tool for pulling the locking element out of the receiving chamber.

10. The fitting according to claim 1 wherein the base body is produced by one of: die forging or casting.

11. The fitting according to claim 1 wherein the connecting body is adapted to be connected to a plastic or plastic and metal composite pipe.

12. A fitting for a pipe having
a base body having a passage for a fluid,
a connecting body releaseably connectable to the base body, also comprising a passage for a fluid, to which a pipe can be connected,
having both bodies comprise contact surfaces configured such that one of the contact surfaces can be slid into the other of the contact surfaces, comprising at least one pair of opposing recesses forming a receiving chamber, and
a substantially incompressible and flexible locking element that can be inserted into the receiving chamber for fixing the two bodies to each other, the locking element having opposing ends,
having at least one of the two bodies comprise a first access chamber extending between an outer surface of the at least one body and the receiving chamber,
having the first access chamber substantially connect to the receiving chamber in a tangential direction and as an extension thereof, and
having the locking element comprise a lock protrusion at one of the opposing ends thereof for locking the locking element externally at at least one of the two bodies in order to prevent the locking element from unintentionally slipping out of the receiving chamber, wherein a second access chamber is implemented in one of the two bodies, extending between the outer surface of the associated body and the receiving chamber, and that the first and second access chambers open into opposite ends of the receiving chamber and are implemented substantially as extensions of the receiving chamber beyond the two opposite ends thereof.

13. The fitting according to claim 12, wherein the receiving chamber extends substantially over 270°, and that the first and second access chambers terminate externally at the associated body in two surfaces running at an angle, to each other, of which one forms the lock surface.

14. A fitting for pipe having
- a base body having a passage for a fluid,
- a connecting body releaseably connectable to the base body, also comprising a passage for a fluid, to which a pipe can be connected,
- having both bodies comprise contact surfaces configured such that one of the contact surfaces can be slid into the other of the contact surfaces, comprising at least one pair of opposing recesses forming a receiving chamber extending substantially over 270°, and
- a substantially incompressible and flexible locking element that can be inserted into the receiving chamber for fixing the two bodies to each other, the locking element having opposing ends,
- having at least one of the two bodies comprise a first access chamber extending between an outer surface of the at least one body and the receiving chamber,
- having the first access chamber substantially connect to the receiving chamber as an extension thereof,
- a second access chamber implemented in one of the two bodies, extending between the outer surface of the associated body and the receiving chamber, and
- having the locking element comprise a lock protrusion at one of the opposing ends thereof for locking the locking element externally at at least one of the two bodies in order to prevent the locking element from unintentionally slipping out of the receiving chamber,
- wherein the first and second access chambers open into opposite ends of the receiving chamber, are implemented substantially as extensions of the receiving chamber beyond the two opposite ends thereof, and terminate externally at the associated body in two surfaces running at an angle to each other, of which one forms the lock surface.

15. The fitting according to claim 14, wherein the contact surfaces are cylindrical and that the opposing recesses extend along at least one part of the contact surfaces in the circumferential direction.

16. The fitting according to claim 14 wherein the two surface run at right angles to each other.

* * * * *